Patented Apr. 11, 1939

2,154,271

UNITED STATES PATENT OFFICE 2,154,271

REFRACTORY ARTICLE

Francis Whitson Higgins, Hale, England, assignor to The Carborundum Company, Niagara Falls, N. Y., a corporation of Delaware No Drawing. Application March 2, 1937, Serial No. 128,651

9 Claims. (Cl. 106—10)

This invention relates to refractory articles which contain constituents such as graphite and SiC which are liable to suffer oxidation during use. While it is of general utility in the manufacture of refractory bodies, the invention is of particular importance when applied to such refractory articles as retorts, crucibles and like shapes, having relatively large surface areas in proportion to their thickness, on account of the greater tendency of such shapes to oxidation in service. The invention is particularly applicable to refractory compositions of two general types—

(1) Those composed of graphite and a clay or ceramic body, usually in about equal proportions, and (2) Those consisting of graphite and silicon carbide as chief ingredients, with a relatively small proportion of ceramic constituents of a more vitreous nature than use in type (1), such as silica plus a flux, as for example, silicate of soda or borax, and generally utilizing a carbonizing binder such as tar, pitch, dextrine, etc., which, on heating, leaves a residue of carbon in the finished article.

The weakness of both the above types of refractory is that they are subject to deterioration through oxidation when in use. In type (1) this results in a marked decrease in conductivity and reduction in resistance to slags, molten metals and fluxes, while in type (2) as well as burning out of graphite, slow oxidation of the silicon carbide takes place, resulting in formation of silica and consequent weakening or cracking of the article.

It is evident, therefore, that with both types, and particularly with type (2), it is of prime importance to reduce the oxidizing propensities to a minimum. With this in mind, it has been the practice to provide a protective glaze on the surface of type (2) refractories, the glaze being of a similar nature to the ceramic bond, but with a higher proportion of fluxing materials so as to make it more fusible. Such refractories have been in use for many years, and while highly satisfactory for many applications, they are not entirely satisfactory under some conditions of use.

This has been particularly true in applications where the refractory has been subjected to the abrasive action of slag or ash at temperatures below the softening point of the combined ash and glaze, or where no such fluxing substances contact the refractory in such a manner as to insure the more or less continuous renewal of the outer impervious glaze coating. For example, a crucible used with solid fuel for melting metals of fairly high melting point, receives extra protection by reason of the layer of fused fuel ash which adheres to the outer surface, and which is renewed each time the crucible is used.

When treating metals of low melting point, however, the furnace temperature is insufficient to fuse the fuel ash, and the initial glaze on the crucible gradually perishes and becomes ineffective in preventing oxidation of the crucible body. The same effect obtains even at higher temperatures when gas or oil are the fuels used, as these fuels are relatively free from ash.

It is the object of the present invention to overcome these short-comings and produce an article which maintains its resistance to oxidation under all conditions without regard to temperature or kind of fuel used.

The invention consists in using for the ceramic body or bond of the article a composition having as an essential ingredient oxide of copper. In practice, we prefer to use cupric oxide together with alumina and silica, and certain fluxes such as soda, potash, lime and borax which when subjected to a high temperature, vitrify and form a complex copper-alumino-silicate. The best effect appears to be obtained when the body is so adjusted as to be fairly fusible, but not to such an extent as to impair the strength of the article at the temperature to which it is subjected in use. It is a surprising fact that this type of body although presumably more fusible than that heretofore used, nevertheless yields an article having a greater hot strength. Laboratory tests on standard sized firebricks of the new material, for example, show a cross-breaking strength at temperatures of 1200–1300° C. 25% greater than the old type.

Refractories thus made from a raw batch which comprises copper oxide have been found definitely superior to those made from a similar batch in which the copper (either with or without the simultaneous presence of metallic silicon) is in metallic form. When metal is so used it apparently migrates toward the outer surface of the body, forming a glaze which is high in copper and which supplies protection against oxidation of the interior of the body only during the early stages of its life while the outer glaze remains intact. When the oxide is used, however, it apparently combines at once upon burning with the silica, borax, alumina, etc. to form more stable copper compounds which remain in place within the refractory body so that the migration to the surface is greatly reduced or eliminated and the copper compound remains interiorly of the body as a protective compound which extends well inside the body with far more lasting effect. The copper oxide combined with the silicates, etc. present moreover forms an internal network of the protective compound which network is intimately fused to the outer glaze and so anchors the latter in place with improved tenacity.

The theory as to why a bond containing oxidic copper compounds should prevent oxidation so much more than one without the copper is not fully understood, but the fact that it does so has been confirmed by practical as well as laboratory tests. Crucibles used for melting aluminum, for instance, using oil or gas as fuel, last two and three times as long as the older type under identical conditions of use.

It is thought that the phenomenon perhaps has to do with certain physical characteristics such as flexibility or ability to wet the refractory granules which make such a bond a more positive and durable protection than any of the more usual types of ceramic glazes.

Whatever the explanation, the fact of the matter is that the copper oxide-containing bond gives an article which is much superior to the older type both in respect of increased strength and greater resistance to oxidation.

While the particular proportions of the constituents of the bond, and the quantity of the bond used, may be varied within wide limits, we give by way of illustration raw batches of the following compositions:

|  | Example A | Example B |
| --- | --- | --- |
|  | Percent | Percent |
| Flake graphite | 17 | 28 |
| Silicon carbide | 50 | 31 |
| Ceramic bond | 10 | 20 |
| Tar | 23 | 21 |

The ceramic bond of above consisting of:

|  | A | B |
| --- | --- | --- |
|  | Percent | Percent |
| Copper oxide | 11.3 | 18.6 |
| Silica | 43.0 | 12.4 |
| Feldspar | 14.4 | 21.5 |
| Borax | 4.3 | 2.3 |
| Whiting (CaCO₃) | 4.8 | 6.4 |
| Calcined clay or kaolin | 22.2 | 38.8 |

*Example C*

| | Per cent |
| --- | --- |
| Fiske graphite | 43 |
| Silicon carbide | 20 |
| Ceramic bond | 33 |
| Dextrin or sulfite lye | 4 |

The ceramic bond consisting of:

| | Per cent |
| --- | --- |
| Copper oxide | 6.1 |
| Silica | 14.2 |
| Feldspar | 10.6 |
| Whiting | 2.5 |
| Plastic clay | 66.6 |

The selection of any given formula is dependent on the temperature and other conditions to which the article will be subjected in use. Thus, for the melting of aluminum, having a relatively low melting point, the ceramic bond of a crucible should be more fusible than for one used at higher temperature, such as for melting nickel or stainless steel.

The raw batches in question are mixed, molded and burned using the standard techniques for carbonaceous materials which are well known in the refractory art, and which do not differ from those employed when copper oxide is not used. This may include the application of a glaze to the outside of the formed body, in which case it is advantageous that the glaze also contain a minor percentage of an oxidic compound of copper.

A modified form of the invention comprises the use of a body of the kind described (i. e., one containing a copper oxide) as a veneer or as a glaze on articles of known types.

Such embodiment of the invention is useful in cases where for certain reasons such as a necessity for high transverse strength a body of a known kind is preferred, and it is simply desired to improve its resistance to oxidation, which may be effected by applying a veneer or a glaze of a kind covered by the invention to the surface or surfaces exposed to the oxidizing influence.

The term "veneer" is here used to indicate a coating of substantial thickness, such as $\frac{1}{16}$" to $\frac{1}{4}$" and consisting of both oxidizable materials and ceramic bond. Such coating is normally incorporated on the body of the article during the moulding operation by means well known in the art. The term "glaze" indicates a relatively thin coating normally less than $\frac{1}{16}$" in thickness—such as may be applied by painting or dipping—and consisting chiefly of ceramic ingredient, suitably modified as to fusibility to produce a vitreous or glassy coating.

While within this specification, an oxide of copper has generally been specified, it is to be understood that any combined oxidic copper compounds such as silicates, boro-silicates, alumino compounds or the like containing copper may be substituted within the scope of the following claims.

I claim:

1. A refractory article containing a carbon-comprising constituent bonded with a ceramic bond comprising an oxidic compound of copper, said oxidic compound of copper being substantially uniformly distributed throughout the body of the refractory article.

2. A refractory article containing a carbon-comprising constituent and comprising a minor percentage of an oxidic copper compound interiorly of the body, said oxidic copper compound being substantially uniformly distributed throughout the body.

3. A refractory article comprising silicon carbide and ceramic material which comprises a minor percentage of an oxidic compound of copper, said oxidic compound of copper being substantially uniformly distributed throughout the body of the refractory article.

4. A refractory article comprising graphite and ceramic material which comprises a minor percentage of an oxidic compound of copper, said oxidic compound of copper being substantially uniformly distributed throughout the body of the refractory article.

5. A raw batch for the manufacture of refractory articles comprising a carbon-comprising ingredient and a ceramic mixture comprising a minor percentage of an oxidic copper compound, said oxidic copper compound being substantially uniformly distributed throughout the raw batch.

6. A refractory article containing silicon carbide and graphite and ceramic material comprising an oxidic copper compound interiorly of the body, said oxidic copper compound being substantially uniformly distributed throughout the body.

7. A raw batch for the manufacture of refractory articles, comprising silicon carbide, graphite and ceramic materials including a minor percentage of an oxidic compound of copper, said oxidic compound of copper being substantially uniformly distributed throughout the raw batch.

8. A refractory composition consisting of silicon carbide, carbon and ceramic material comprising a minor percentage of copper oxide, said copper oxide being substantially uniformly distributed throughout the composition.

9. A refractory article composed interiorly of flake graphite, silicon carbide, carbon and ceramic material comprising a minor percentage of copper oxide, a surface of said article being coated with a glaze comprising an oxidic compound of copper, said copper oxide being also substantially uniformly distributed throughout the body of the article.

FRANCIS WHITSON HIGGINS.